US011436357B2

(12) United States Patent
VanBlon et al.

(10) Patent No.: US 11,436,357 B2
(45) Date of Patent: Sep. 6, 2022

(54) CENSORED ASPECTS IN SHARED CONTENT

(71) Applicant: Lenovo (Singapore) Pte. Ltd., Singapore (SG)

(72) Inventors: Russell Speight VanBlon, Raleigh, NC (US); Mark Patrick Delaney, Raleigh, NC (US); Nathan J. Peterson, Oxford, NC (US); John Carl Mese, Cary, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/107,014

(22) Filed: Nov. 30, 2020

(65) Prior Publication Data
US 2022/0171867 A1    Jun. 2, 2022

(51) Int. Cl.
*G06F 21/62* (2013.01)
*G06F 21/33* (2013.01)
*G06F 21/54* (2013.01)
*G06F 21/60* (2013.01)

(52) U.S. Cl.
CPC ........ *G06F 21/6218* (2013.01); *G06F 21/335* (2013.01); *G06F 21/54* (2013.01); *G06F 21/604* (2013.01); *G06F 2221/032* (2013.01); *G06F 2221/2125* (2013.01)

(58) Field of Classification Search
CPC .... G06F 21/6218; G06F 21/335; G06F 21/54; G06F 21/604; G06F 2221/032; G06F 2221/2125
See application file for complete search history.

(56) References Cited

U.S. PATENT DOCUMENTS

| | | | |
|---|---|---|---|
| 10,146,960 B1 * | 12/2018 | Wilczynski | G06F 21/629 |
| 10,250,401 B1 * | 4/2019 | Skiff | H04L 63/0245 |
| 10,410,000 B1 * | 9/2019 | Ghafourifar | G06F 21/10 |
| 10,521,605 B1 * | 12/2019 | Scuderi | G06F 16/24573 |
| 10,691,757 B1 * | 6/2020 | Chen | G06F 21/604 |
| 10,701,079 B1 * | 6/2020 | Ledet | H04L 63/102 |
| 11,030,351 B2 * | 6/2021 | Balakrishna | G06F 21/604 |
| 2008/0168135 A1 * | 7/2008 | Redlich | G06F 16/26 709/204 |
| 2009/0007262 A1 * | 1/2009 | Wallace | G06F 21/6218 726/21 |
| 2009/0164878 A1 * | 6/2009 | Cottrille | G06F 21/6245 726/21 |

(Continued)

*Primary Examiner* — Darren B Schwartz
(74) *Attorney, Agent, or Firm* — Ference & Associates LLC

(57) ABSTRACT

One embodiment provides a method, including: receiving, at an information handling device, an indication to share content displayed by the information handling device with an individual; identifying, using a processor, a sensitivity level associated with an aspect of the content; identifying a permission level associated with the individual; determining, using a processor, whether the permission level enables the individual access to the aspect based on the sensitivity level; and censoring, responsive to determining that the permission level does not enable the individual access to the aspect, the aspect from the individual. Other aspects are described and claimed.

18 Claims, 3 Drawing Sheets

(56) References Cited

U.S. PATENT DOCUMENTS

| | | | | |
|---|---|---|---|---|
| 2009/0199302 A1* | 8/2009 | So | G06F 21/6218 | 726/27 |
| 2010/0131551 A1* | 5/2010 | Benzaken | G06F 21/6245 | 715/810 |
| 2011/0099643 A1* | 4/2011 | Harvey | G06F 21/6245 | 726/30 |
| 2011/0206285 A1* | 8/2011 | Hodge | G06F 21/84 | 382/224 |
| 2011/0314392 A1* | 12/2011 | Howarth | G06F 21/6218 | 715/753 |
| 2012/0157044 A1* | 6/2012 | Kim | G06F 21/84 | 455/410 |
| 2012/0254941 A1* | 10/2012 | Levien | G06F 21/32 | 726/3 |
| 2013/0007895 A1* | 1/2013 | Brolley | G06F 21/62 | 726/28 |
| 2015/0186635 A1* | 7/2015 | Nakhjiri | H04L 63/105 | 726/17 |
| 2016/0132721 A1* | 5/2016 | Bostick | G06F 21/6254 | 382/118 |
| 2016/0180108 A1* | 6/2016 | Nichols | G06F 21/604 | 726/28 |
| 2016/0210473 A1* | 7/2016 | Cohen | G06F 21/6245 | |
| 2017/0040002 A1* | 2/2017 | Basson | G06F 21/84 | |
| 2017/0206366 A1* | 7/2017 | Fay | G06F 21/604 | |
| 2017/0339216 A1* | 11/2017 | Carlos | H04L 67/142 | |
| 2018/0189461 A1* | 7/2018 | Ghafourifar | H04N 21/631 | |
| 2018/0191686 A1* | 7/2018 | Ghafourifar | H04L 9/14 | |
| 2018/0276398 A1* | 9/2018 | Linton | G06F 21/121 | |
| 2018/0285591 A1* | 10/2018 | Thayer | G06F 21/6245 | |
| 2019/0392176 A1* | 12/2019 | Taron | G06F 3/167 | |
| 2020/0042837 A1* | 2/2020 | Skinner | G06K 9/623 | |
| 2020/0169567 A1* | 5/2020 | Queen | G06F 21/6218 | |
| 2020/0243115 A1* | 7/2020 | Witt | G06F 21/6245 | |
| 2020/0342059 A1* | 10/2020 | Ziuzin | G06F 40/211 | |
| 2021/0073420 A1* | 3/2021 | Ramadhane | G06N 5/04 | |
| 2021/0097190 A1* | 4/2021 | Scrivano | H04L 63/104 | |
| 2021/0182430 A1* | 6/2021 | Negi | G06F 21/6263 | |
| 2021/0266734 A1* | 8/2021 | Kapinos | G06V 40/197 | |
| 2021/0374275 A1* | 12/2021 | Singh | G06F 21/6218 | |

* cited by examiner

CENSORED ASPECTS IN SHARED CONTENT

BACKGROUND

Advances in technology have enabled individuals to easily share content resident on their information handling devices ("devices"), for example laptop and/or personal computers, convertible devices, tablets, smart phones, and the like, with one or more other individuals. For example, in an online conference a presenter may be able to share certain content (e.g., a word document, one or more slides, a communication thread, an application window, other content present on a presenter's screen, etc.) with the other attendees in the conference.

BRIEF SUMMARY

In summary, one aspect provides a method, comprising: receiving, at an information handling device, an indication to share content displayed by the information handling device with an individual; identifying, using a processor, a sensitivity level associated with an aspect of the content; identifying a permission level associated with the individual; determining, using a processor, whether the permission level enables the individual access to the aspect based on the sensitivity level; and censoring, responsive to determining that the permission level does not enable the individual access to the aspect, the aspect from the individual.

Another aspect provides an information handling device, comprising: a processor; a memory device that stores instructions executable by the processor to: receive an indication to share content displayed by the information handling device with an individual; identify a sensitivity level associated with an aspect of the content; identify a permission level associated with the individual; determine whether the permission level enables the individual access to the aspect based on the sensitivity level; and censor, responsive to determining that the permission level does not enable the individual access to the aspect, the aspect from the individual.

A further aspect provides a product, comprising: a storage device that stores code, the code being executable by a processor and comprising: code that receives an indication to share content displayed by an information handling device with an individual; code that identifies a sensitivity level associated with an aspect of the content; code that identifies a permission level associated with the individual; code that determines whether the permission level enables the individual access the aspect based on the sensitivity level; and code that censors, responsive to determining that the individual does not have permission to access the aspect, the aspect from the individual.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
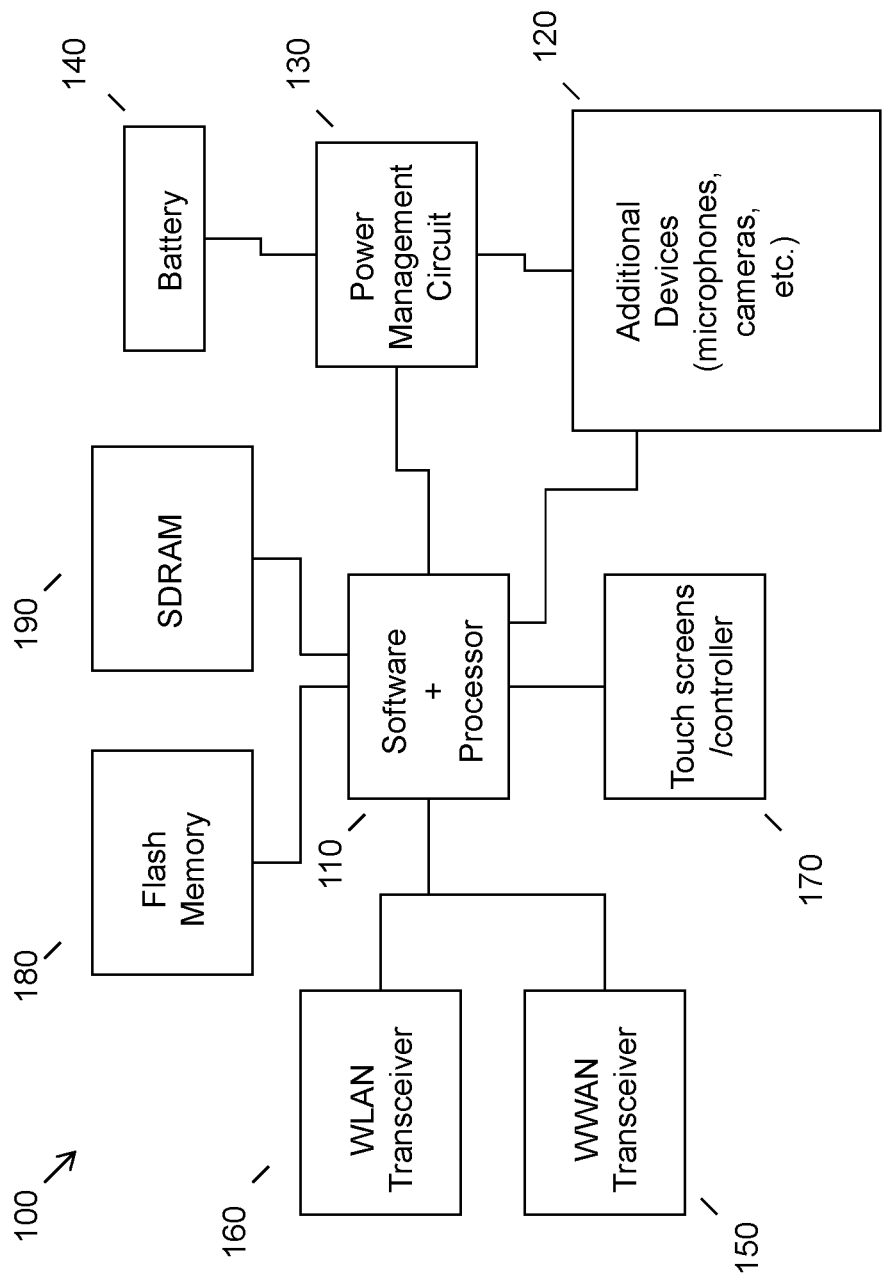
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When sharing screen content with one or more other individuals (e.g., during a group conversation, a presentation, an online conference, etc.) a sharer may not want certain aspects of the content to be shared (e.g., with any of the other individuals, with a particular individual, etc.). For example, a slide presentation shared with a group may contain content of different sensitivity levels. More particularly, one slide may contain more sensitive information than another slide and/or a single slide may contain content of varying sensitivity levels (e.g., high sensitivity, low sensitivity, etc.).

Conventional techniques for sharing content generally do not provide a sharer with such a granular level of control that they may prevent specific aspects of the content from being shared (e.g., certain emails, specific information present in a slide or a word document, etc.). Although existing solutions may allow a sharer to share a specific application window rather than their entire screen, there is currently no support to dynamically censor specific content within that application window.

Accordingly, a method is provided that may dynamically censor content within an application based on one or more different factors. In an embodiment, an indication to share content may be received at a device (e.g., an indication may be received to share content with another individual, with a group of other individuals, etc.). An embodiment may then identify a sensitivity level associated with at least one aspect (e.g., one word, one sentence, one image, one page, one slide, etc.) of the content. Thereafter, an embodiment may determine whether the designated individual(s) have permission to access the at least one aspect and, responsive to determining that they don't, an embodiment may dynamically censor that aspect out of the remainder of the shared content.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
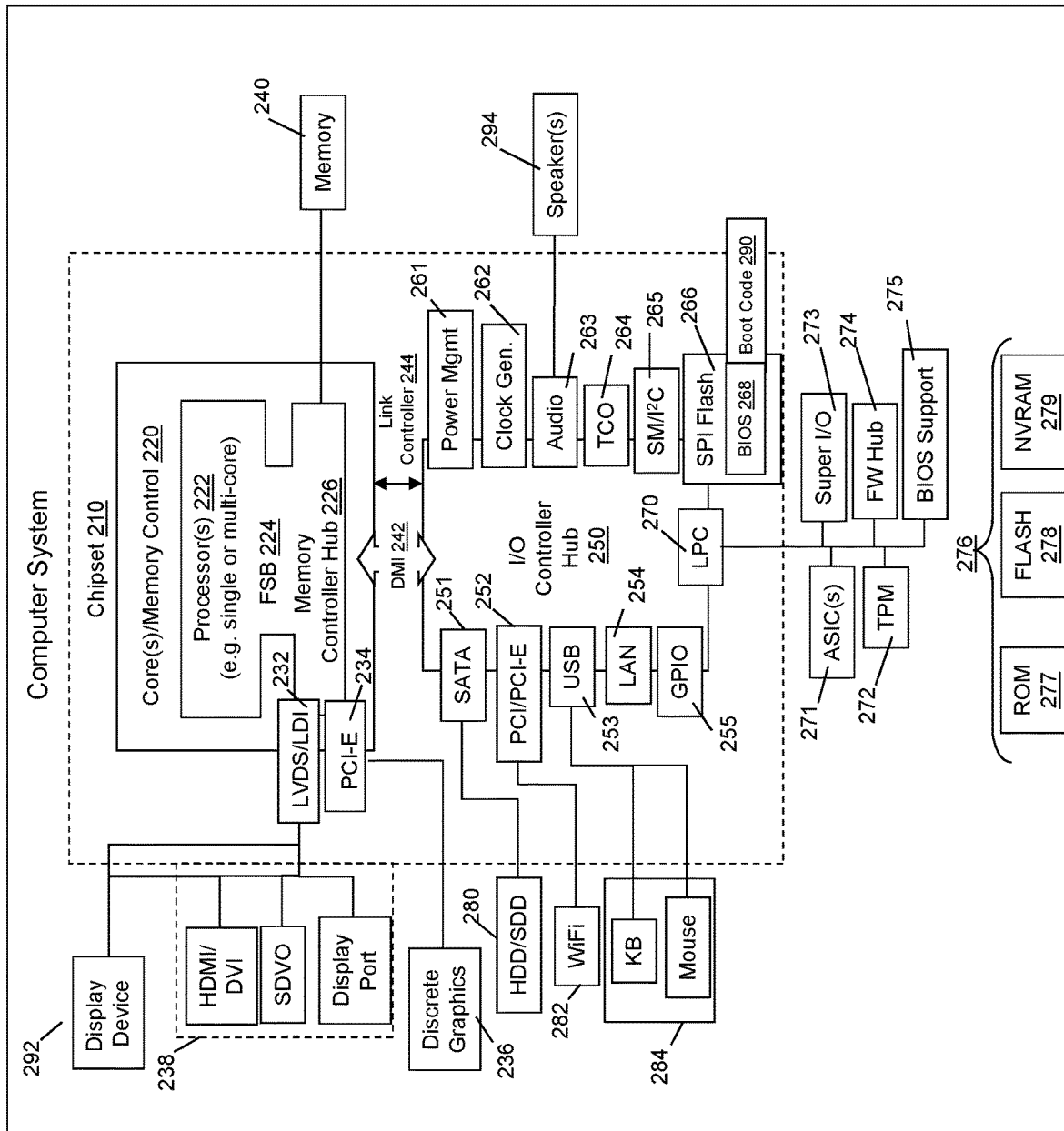
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of sharing virtual content with other devices. For example, the circuitry outlined in FIG. 1 may be implemented in a smart phone or tablet embodiment, whereas the circuitry outlined in FIG. 2 may be implemented in a laptop.

Figure 3:
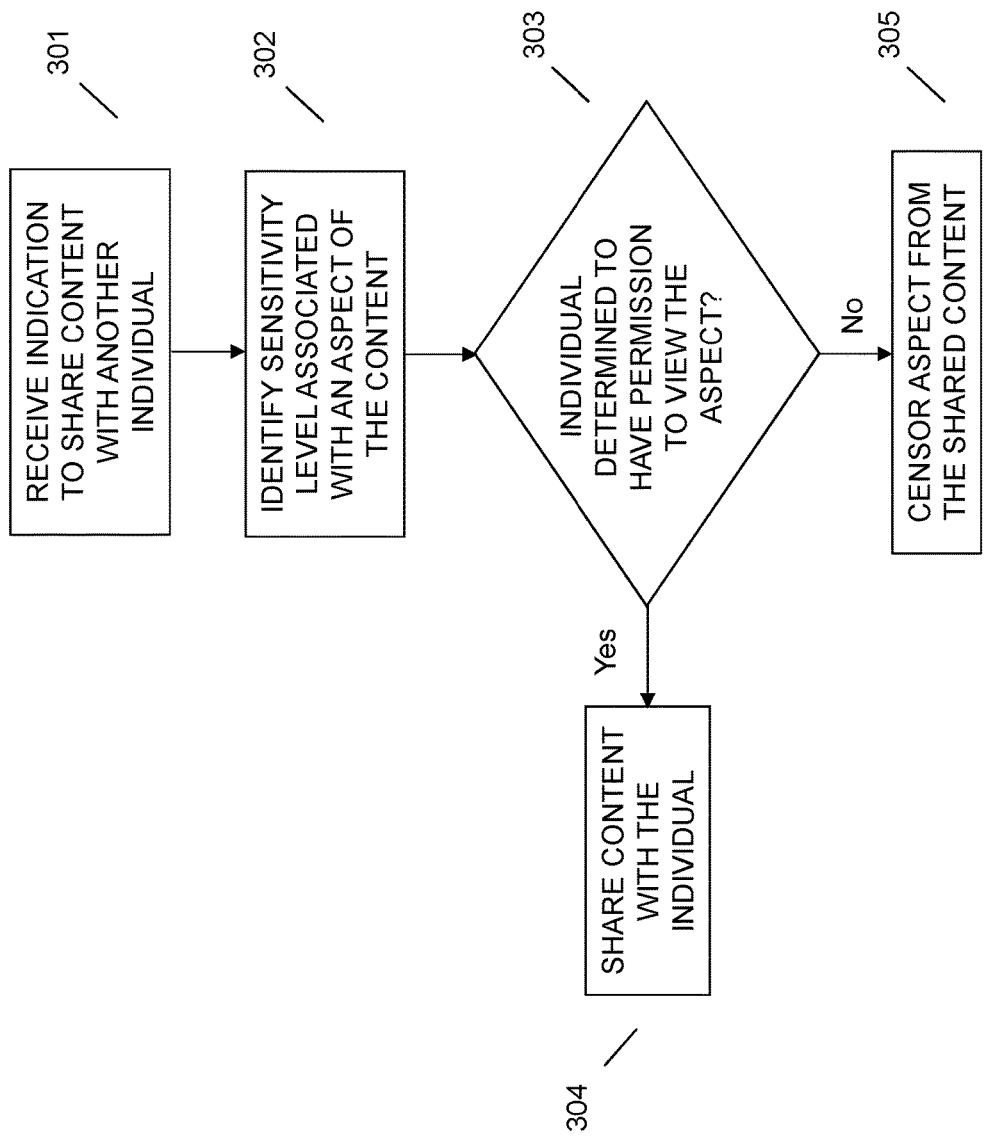
FIG. 3 illustrates an example method of dynamically censoring shared content.

Referring now to FIG. 3, a method for dynamically censoring aspects of shared content. At 301, an embodiment may receive an indication to share content with one or more other individuals. In an embodiment, the indication may be produced in response to a user performing a content share action. For example, a user may select a "share" option in an online conferencing application. Alternatively, the content share action may simply be a transmission of content to one or more other users using conventional transmission means (e.g., via an email, a text message, a group message, etc.). In an embodiment, the content may be virtually any type of digital content that is shareable by a user. For example, the content may be an a word document, an image or video, an audio file, a slideshow, an email thread, an application window, a desktop view of the user's screen contents, etc.

At 302, an embodiment may identify a sensitivity level associated with at least one aspect that is present within the shared content. In an embodiment, an aspect may correspond to virtually any sub-content present within the larger shared content. For example, the aspect may correspond to one or more words or sentences in a shared word document, an image in a shared email thread, a single slide within a shared slideshow, certain content present in an application window in a shared screen, a particular file within a shared folder, etc.

In an embodiment, indications of the sensitivity levels for each aspect may be identified in different ways. For example, sensitivity levels for some or all aspects may be stored at an accessible storage location (e.g., stored locally on the device, stored remotely on another device or server, etc.). Additionally or alternatively, the shared content may provide indications of the sensitivity levels of the aspects contained therein (e.g., in metadata associated with the content, etc.). For example, a shared slideshow may contain knowledge of which slides within the slide deck contain sensitive information. In an embodiment, the sensitivity levels may be established by the user, a manufacturer of the device, a programmer of an application that is being shared, and the like. In an embodiment, indications of the sensitivity levels may be provided to: the device sharing the content, the application through which the content will be shared, or a combination thereof.

At 303, an embodiment may determine whether an individual that the content is being shared with has permission to visualize, or access, certain aspects of the shared content. This determination may be facilitated by first identifying a permission level associated with the individual targeted to receive access to the shared content. The permission level associated with each individual may be based upon one or more different factors. For example, the permission level may be based upon an individual's explicit clearance level (e.g., provided to them by a company, corporation, other individual, etc.). In this situation, individuals with a higher clearance level may have access to more content than those individuals with a lower clearance level. In another example, the permission level may be based upon an individual's relationship, or relevance to, the aspect in the shared content (e.g., whether the aspect is related to something that was previously directed to an individual, whether the aspect is related to a project an individual is working on or assigned to, whether the aspect is related to a group an individual is part of, etc.). For instance, when an email application window is shared, those individuals who were copied on certain emails are considered to have enough permission to view those emails in the shared screen whereas other individuals who were not originally copied may not have permission to view the email. Other permission level identification techniques, not explicitly described above, may also be utilized. Once a permission level is identified for an individual, an embodiment may then compare the identified permission level to the sensitivity level of the aspect to determine whether or not the individual has enough authority to view the aspect in the shared content.

Responsive to determining, at 303, that the recipient of the shared content has permission to access the aspect, an embodiment may, at 304, share the entirety of the content with the recipient. Conversely, responsive to determining, at 305, that the recipient of the shared content does not have permission to access the aspect, an embodiment may, at 305, censor the aspect from the shared content.

In an embodiment, censorship of the aspect may take on a variety of different forms. For instance, an embodiment may simply remove the aspect from the remainder of the content prior to sharing. More particularly, the sharing application may present each recipient of the shared content with a specific view based upon their allotted permissions. Aspects of the shared content with a higher sensitivity level than a recipients permissions may simply be excluded from content. In another embodiment, the aspect may be obscured (e.g., visually and/or audibly, etc.) in some way when the content is shared so as to prevent the recipient from hearing or seeing the aspect. For example, an embodiment may: redact the aspect from the shared content, audibly or visually distort the aspect, blur the aspect, etc.

In an embodiment, the aspect may be censored for each recipient of the shared content. For instance, if a user shared content with a group of ten individuals and none of those individuals are determined to have permission to access the aspect then an embodiment may censor that aspect from each of those individuals when the content is shared. Additionally or alternatively, when some individuals have greater permissions for certain aspects than others, the entire group may be presented with the screen view of the least privileged viewer. Alternatively, an embodiment may only censor the content from a subset of the other individuals. For example, if a user shared content with a group of ten individuals and only three of those individuals are determined to have permission to access the aspect then an embodiment may allow those three individuals to access the aspect while simultaneously censoring the aspect for the other seven individuals.

In an embodiment, a user may receive an indication (e.g., an audible or visual notification on their device, etc.) regarding which individuals had aspects censored as well as which specific aspects were censored for those individuals. In this situation, the individuals for whom aspects were censored may be visually distinguished to the user in some way. For example, a user that shares their screen with other individuals in an online conference may see that those individuals whose names or avatar boxes are highlighted have some aspects of the shared content censored. Upon selection of a highlighted individual, a user may be further apprised of the aspects that were censored for that individual. In a similar vein, recipients of the shared content may be provided with an indication when one or more aspects are removed from view.

In an embodiment, a user may be provided with an option to override a censor action for one or more individuals. For example, upon review of an embodiment's determination to dynamically censor an aspect for a particular individual, the user may choose to allow that individual to visualize the aspect by selecting the override option. In an embodiment, the override option may manifest as a selectable button in the sharing application or somewhere on the device.

Provided below are two non-limiting practical implementations of the foregoing concepts.

In one example scenario, a user may have an email application open while sharing their screen with others. Various aspects of the email application (e.g., other visible emails, recipients and/or sender of those emails, calendar entries, contact lists, etc.) may be censored for some of the individuals the screen was shared with. For example, emails that individuals are not on copy to may be censored from view for those individuals. As another example, emails that contain content which is not relevant to a topical context of a current meeting may also be dynamically censored from view.

In another example scenario, a user may share a slide deck in a presentation application with other individuals during an online conference. The slides in the deck may contain information of varying sensitivity levels and the recipients of the slide deck may have varying degrees of permissions. Although the same slide deck may be shared with each recipient, the censored aspects of the slide deck may vary among the individuals based upon their permissions. Additionally, parts of the presentation (e.g., an audio feed, etc.) may dynamically cut off for an individual when the presenter is discussing an aspect that is censored for that individual. Such an embodiment may allow a user to carry on with their full presentation without continually requiring individuals to leave the conference when an aspect is discussed that they do not have the requisite permission to view.

The various embodiments described herein thus represent a technical improvement to conventional methods for sharing and/or censoring shared content. Using the techniques described herein, an embodiment may first receive an indication to share content from their device with one or more other individuals. An embodiment may then identify a sensitivity level of an aspect of the content and thereafter determine whether an individual targeted to receive the shared content has permission to view the aspect. More particularly, an embodiment may identify a permission level of the targeted individual, as it pertains to the aspect, and compare that permission level to the sensitivity level of the aspect to determine whether the individual has the authority to view the content. Responsive to determining that the individual does not have the requisite permissions to view the aspect, an embodiment may dynamically censor the aspect out from the content when it is shared with the individual. Such a method may ensure that only the individuals authorized to access certain content are the ones able to see it when that content is shared by a user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

receiving, at an information handling device, an indication to share content displayed by the information handling device with a plurality of individuals, wherein the content comprises a plurality of aspects, wherein each of the aspects comprises sub-content less than an entirety of the content to be shared;

identifying, using a processor, a sensitivity level associated with each of the plurality of aspects of the content;

identifying a permission level associated with each of the plurality of individuals;

determining, using a processor and based upon the sensitivity level of each of the plurality of aspects and the permission levels for each of the plurality of individuals, the aspects of the plurality of aspects accessible by each of the plurality of individuals based upon the permission level of each of the plurality of individuals;

censoring, responsive to determining that at least one of the permission levels of the plurality of individuals does not enable at least one of the plurality of individuals access to aspects of the plurality of aspects, the aspects of the plurality of aspects from the at least one of the plurality of individuals wherein the censoring comprises censoring at least one of the plurality of aspects from a subset of the plurality of individuals and simultaneously allowing the at least one of the plurality of aspects to other of the plurality of individuals, wherein the subset is determined to be individuals of the plurality of individuals whose permission levels do not enable access to the at least one of the plurality of aspects; and displaying, on a display device of the information handling device, a visual distinguishment of the aspects of the plurality of aspects that were censored from other of the plurality of aspects that were not censored.

2. The method of claim 1, wherein the aspect comprises at least one aspect selected from the group consisting of an active application window, an element within the application window, and a communication thread.

3. The method of claim 1, wherein the censoring comprises dynamically censoring the aspect without receiving any additional user input.

4. The method of claim 1, wherein the censoring the at aspect comprises visually obscuring the aspect from the individual.

5. The method of claim 1, wherein the censoring the aspect comprises removing the aspect from the content.

6. The method of claim 1, further comprising providing a user of the information handling device with a list of censored individuals.

7. The method of claim 6, further comprising:
receiving, from a user of the information handling device, a censor override for the censored individual; and
enabling, responsive to receiving the censor override, the censored individual access to the aspect.

8. The method of claim 1, further comprising enabling the individual access to another aspect of the content having a different sensitivity level commensurate with the permission level of the individual.

9. The method of claim 8, wherein the enabling comprises presenting the another aspect of the content alongside the censored aspect.

10. An information handling device, comprising:
a processor;
a memory device that stores instructions executable by the processor to:
receive an indication to share content displayed by the information handling device with a plurality of individuals, wherein the content comprises a plurality of aspects, wherein each of the aspects comprises sub-content less than an entirety of the content to be shared;
identify a sensitivity level associated with each of the plurality of aspects of the content;
identify a permission level associated with each of the plurality of individuals;
determine, based upon the sensitivity level of each of the plurality of aspects and the permission levels for each of the plurality of individuals, the aspects of the plurality of aspects accessible by each of the plurality of individuals based upon the permission level of each of the plurality of individuals;
censor, responsive to determining that at least one of the permission levels of the plurality of individuals does not enable at least one of the plurality of individuals access to aspects of the plurality of aspects, the aspects of the plurality of aspects from the at least one of the plurality of individuals, wherein the censoring comprises censoring at least one of the plurality of aspects from a subset of the plurality of individuals and simultaneously allowing the at least one of the plurality of aspects to other of the plurality of individuals, wherein the subset is determined to be individuals of the plurality of individuals whose permission levels do not enable access to the at least one of the plurality of aspects; and
display, on a display device of the information handling device, a visual distinguishment of the aspects of the plurality of aspects that were censored from other of the plurality of aspects that were not censored.

11. The information handling device of claim 10, wherein the aspect comprises at least one aspect selected from the group consisting of an active application window, an element within the application window, and a communication thread.

12. The information handling device of claim 10, wherein the instructions executable by the processor to censor the aspect comprise instructions executable by the processor to visually obscure the aspect from the individual.

13. The information handling device of claim 10, wherein the instructions executable by the processor to censor the aspect comprise instructions executable by the processor to remove the aspect from the content.

14. The information handling device of claim 10, wherein the instructions are further executable by the processor to provide a user of the information handling device with a list of censored individuals.

15. The information handling device of claim 10, wherein the instructions are further executable by the processor to:
receive, from a user of the information handling device, a censor override for the censored individual; and
enable, responsive to receiving the censor override, the censored individual access to the aspect.

16. The information handling device of claim 10, wherein the instructions are further executable by the processor to enable the individual access to another aspect of the content having a different sensitivity level commensurate with the permission level of the individual.

17. The information handling device of claim 16, wherein the instructions executable by the processor to enable comprise instructions executable by the processor to present the another aspect of the content alongside the censored aspect.

18. A product, comprising:
a storage device that stores code, the code being executable by a processor and comprising:
code that receives an indication to share content displayed by an information handling device with a plurality of individuals, wherein the content comprises a plurality of aspects, wherein each of the aspects comprises sub-content less than an entirety of the content to be shared;
code that identifies a sensitivity level associated with each of the plurality of aspects of the content;
code that identifies a permission level associated with each of the plurality of individuals;
code that determines and based upon the sensitivity level of each of the plurality of aspects and the permission levels for each of the plurality of individuals, the aspects of the plurality of aspects accessible by each of the plurality of individuals based upon the permission level of each of the plurality of individuals;
code that censors, responsive to determining that at least one of the permission levels of the plurality of individuals does not enable at least one of the plurality of individuals access to aspects of the plurality of aspects, the aspects of the plurality of aspects from the at least one of the plurality of individuals, wherein the censoring comprises censoring at least one of the plurality of aspects from a subset of the plurality of individuals and simultaneously allowing the at least one of the plurality of aspects to other of the plurality of individuals, wherein the subset is determined to be individuals of the plurality of individuals whose permission levels do not enable access to the at least one of the plurality of aspects; and
code that displays, on a display device of the information handling device, a visual distinguishment of the aspects of the plurality of aspects that were censored from other of the plurality of aspects that were not censored.

\* \* \* \* \*